US007349892B1

(12) United States Patent
Virdy

(10) Patent No.: US 7,349,892 B1
(45) Date of Patent: Mar. 25, 2008

(54) SYSTEM AND METHOD FOR AUTOMATICALLY ORGANIZING AND CLASSIFYING BUSINESSES ON THE WORLD-WIDE WEB

(75) Inventor: Ajaipal Singh Virdy, Loudoun County, VA (US)

(73) Assignee: AOL LLC, Dulles, VA (US)

( * ) Notice: Subject to any disclaimer, the term of this patent is extended or adjusted under 35 U.S.C. 154(b) by 512 days.

(21) Appl. No.: 10/705,822

(22) Filed: Nov. 13, 2003

Related U.S. Application Data

(63) Continuation of application No. 09/500,471, filed on Feb. 9, 2000, now Pat. No. 6,691,105, which is a continuation of application No. 08/844,522, filed on Apr. 18, 1997, now Pat. No. 6,148,289.

(60) Provisional application No. 60/017,548, filed on May 10, 1996.

(51) Int. Cl.
*G06F 17/30* (2006.01)
(52) U.S. Cl. .................... 707/3; 707/101; 707/102; 707/103 R; 707/104.1
(58) Field of Classification Search .............. 707/1–10, 707/100–104.1, 200–206
See application file for complete search history.

(56) References Cited

U.S. PATENT DOCUMENTS

| | | | |
|---|---|---|---|
| 4,586,091 A | 4/1986 | Panaoussis | |
| 4,809,081 A | 2/1989 | Linehan | |
| 5,200,993 A | 4/1993 | Wheeler et al. | |
| 5,384,835 A | 1/1995 | Wheeler et al. | |
| 5,404,510 A | 4/1995 | Smith et al. | |
| 5,412,804 A | 5/1995 | Krishna | |
| 5,452,445 A | 9/1995 | Hallmark et al. | |
| 5,485,608 A | 1/1996 | Lomet et al. | |
| 5,485,610 A | 1/1996 | Gioielli et al. | |
| 5,495,608 A | 2/1996 | Antoshenkov | |
| 5,500,929 A | 3/1996 | Dickinson | |
| 5,530,852 A | 6/1996 | Meske, Jr. et al. | |

(Continued)

FOREIGN PATENT DOCUMENTS

GB 2114407 A 8/1983

(Continued)

OTHER PUBLICATIONS

Database 16 (IAC PROMT) on Dialog, No. 6303723, "IMPERATIVE! Announces New Site for Locating Companies on the Internet", PR Newswire, Jul. 22, 1996, 2 pages.

(Continued)

*Primary Examiner*—Isaac Woo
(74) *Attorney, Agent, or Firm*—Fish & Richardson P.C.

(57) ABSTRACT

A method and search engine for classifying a source publishing a document on a portion of a network, includes steps of electronically receiving a document, based on the document, determining a source which published the document, and assigning a code to the document based on whether data associated with the document published by the source matches with data contained in a database. An intelligent geographic- and business topic-specific resource discovery system facilitates local commerce on the World-Wide Web and also reduces search time by accurately isolating information for end-users. Distinguishing and classifying business pages on the Web by business categories using Standard Industrial Classification (SIC) codes is achieved through an automatic iterative process.

23 Claims, 6 Drawing Sheets

U.S. PATENT DOCUMENTS

| | | |
|---|---|---|
| 5,751,961 A | 5/1998 | Smyk |
| 5,764,906 A | 6/1998 | Edelstein et al. |
| 5,778,367 A * | 7/1998 | Wesinger et al. ............ 707/10 |
| 5,805,810 A | 9/1998 | Maxwell |
| 5,828,990 A | 10/1998 | Nishino et al. |
| 5,878,233 A | 3/1999 | Schloss |
| 5,878,398 A | 3/1999 | Tokuda et al. |
| 5,930,474 A * | 7/1999 | Dunworth et al. .......... 709/217 |
| 5,948,040 A | 9/1999 | DeLorme et al. |
| 6,002,853 A | 12/1999 | de Hond |

FOREIGN PATENT DOCUMENTS

| WO | WO 93/18484 | 9/1993 |
|---|---|---|
| WO | WO 95/08809 | 3/1995 |

OTHER PUBLICATIONS

Database 148 (Trade and Industry Database) on Dialog, No. 7559252, "Open Market Inc. offers Internet Users Free Access to Directory of Commercial Sites on the Internet", Business Wire, Nov. 8, 1994, 2 pages.

Schwartz et al., "Applying an Information Gathering Architechture to Netfind: A White Pages Tool for a Changing and Growing Internet", IEEE/ACM Transactions on Networking, vol. 2, No. 5, Oct. 1994, pp. 426-439.

* cited by examiner

SYSTEM AND METHOD FOR AUTOMATICALLY ORGANIZING AND CLASSIFYING BUSINESSES ON THE WORLD-WIDE WEB

CROSS REFERENCE TO RELATED APPLICATIONS

This application is a continuation application of U.S. application Ser. No. 09/500,471, filed Feb. 9, 2000, now U.S. Pat. No. 6,691,105 and titled "System and Method for Geographically Organizing and Classifying Businesses on the World-Wide Web," which is a continuation application of U.S. application Ser. No. 08/844,522, filed Apr. 18, 1997, titled "System and Method for Geographically Organizing and Classifying Businesses on the World-Wide Web," now U.S. Pat. No. 6,148,289, which claims the benefit of U.S. Provisional Application No. 60/017,548, filed May 10, 1996, all of which are incorporated by reference.

BACKGROUND OF THE INVENTION

The present invention generally relates to a resource discovery system and method for facilitating local commerce on the World-Wide Web and for reducing search time by accurately isolating information for end-users. For example, distinguishing and classifying business pages on the Web by business categories using the Standard Industrial Classification (SIC) codes is achieved through an automatic iterative process which effectively localizes the Web.

Description of the Related Art

Resource discovery systems have been widely studied and deployed to collect and index textual content contained on the World-Wide Web. However, as the volume of accessible information continues to grow, it becomes increasingly difficult to index and locate relevant information. Moreover, global flat file indexes become less useful as the information space grows causing user queries to match too much information.

Leading organizations are attempting to classify and organize all of Web space in some manner. The most notable example is Yahoo, Inc. which manually categorizes Web sites under fourteen broad headings and 20,000 different sub-headings. Still others are using advanced information retrieval and mathematical techniques to automatically bring order out of chaos on the Web.

Solutions to solve this information overload problem have been addressed by C. Mic Bowman et al. using Harvest: A Scalable, Customizable Resource Discovery and Access System. Harvest supports resource discovery through topic-specific content indexing made possible by a very efficient distributed information gathering architecture. However, these topic specific brokers require manual construction and they are geared more for academic and scientific research than commercial applications.

Cornell's SMART engine developed by Gerard Salton uses a thesaurus to automatically expand a user's search and capture more documents. Individual, Inc. uses this system to sift through vast amounts of textual data from news sources by filtering, capturing, and ranking articles and documents based on news industry classification.

The latest attempts for automated topic-specific indexing include the Excite, Inc. search engine which uses statistical techniques to build a self-organizing classification scheme. Excite Inc.'s implementation is based on a modification of the popular inverted word indexing technique which takes into account concepts (i.e., synonymy and homonymy) and analyzes words that frequently occur together. Oracle has developed a system called ConText to automatically classify documents under a nine-level hierarchy that identifies a quarter-million different concepts by understanding the written English language. ConText analyzes a document and then decides which of the concepts best describe the document's topic.

The systems described above all attempt to organize the vast amounts of data residing on the Web. However, these mathematical information retrieval techniques for classifying documents only work when the message of a document is directly correlated to the words it contains. Attempts to isolate documents by regions or to separate business content from personal content in an automated fashion is not addressed by any conventional system or structure.

SUMMARY OF THE INVENTION

It is therefore an object of the present invention to provide a method and system for overcoming the above-mentioned problems of the conventional methods and techniques.

The invention is based on a heuristic algorithm which exploits common Web page design principles. The key challenge is to ascertain the owner of a Web page through an iterative process. Knowing the owner of a Web page helps identify the nature of the content business or personal which, in turn, helps identify the geographic location.

In a first aspect of the invention, a method of classifying a source publishing a document on a portion of a network, includes steps of electronically receiving a document, based on the document, determining a source which published the document, and assigning a code to the document based on whether data associated with the document published by the source matches with data contained in a database.

In a second aspect, a search engine is provided for use on a network for distinguishing between business web pages and personal web pages. The search engine includes a mechanism for parsing the content of a hyper-text markup language (HTML) at a web address and searching for criteria contained therein, a mechanism for analyzing a uniform resources locator (URL) of the web address to determine characteristics thereof of a web page at the web address, a mechanism for determining whether the criteria match with data contained in a database, and a mechanism for cross-referencing a match, determined by the determining mechanism, to a second database, to classify a source which published the web page.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
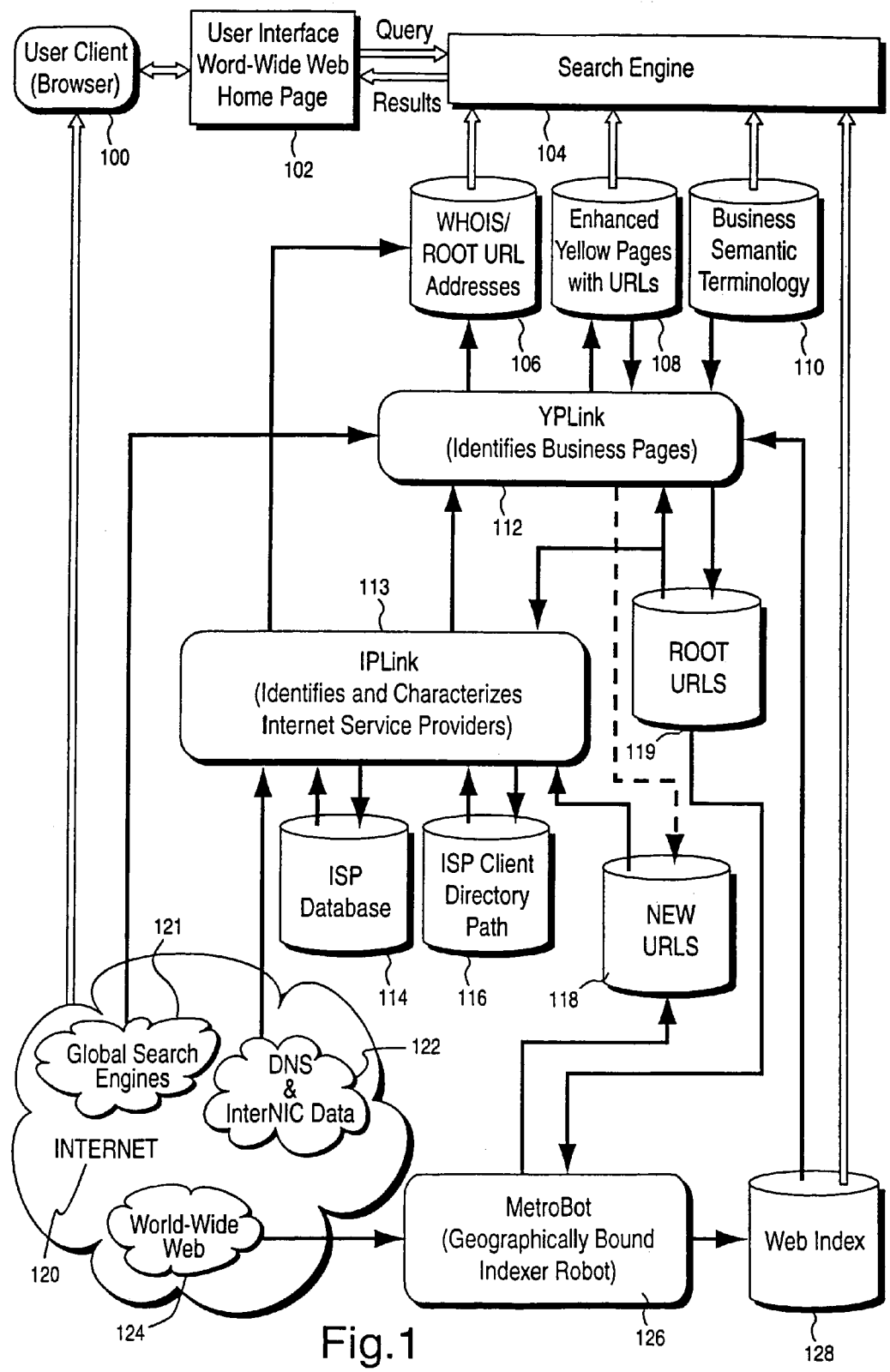
FIG. 1 shows the process flow diagram of a geographically bound resource discovery system including three main components of the invention (sometime referred to below as "MetroSearch") identified as MetroBot, IPLink, and YPLink.
Figure 2:
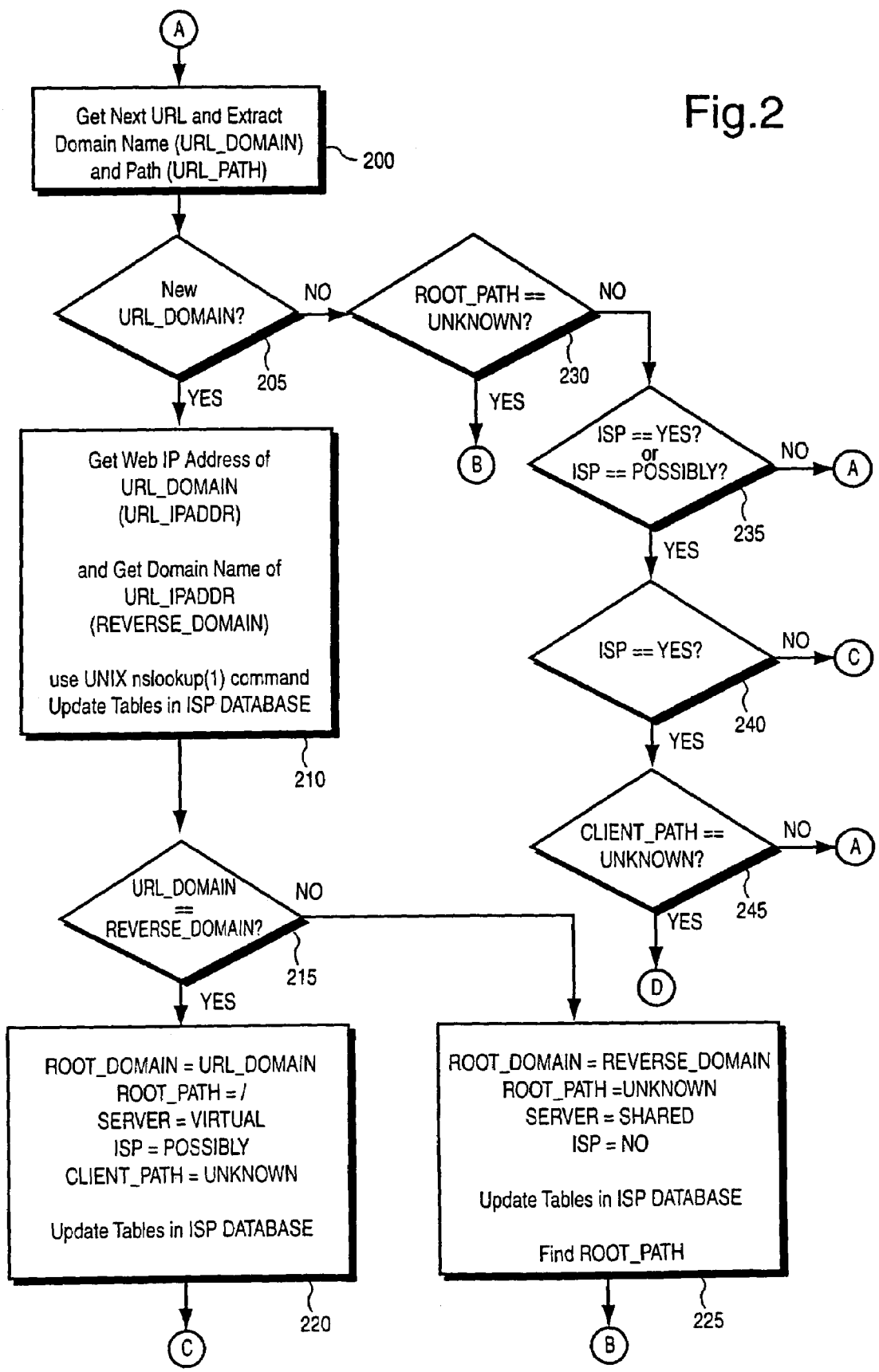
FIG. 2 depicts the IPLink flow chart, the process for identifying ISPs and Client Directory Paths.

Referring now to the drawings, and more particularly to FIG. 1, there is shown the general arrangement of a preferred embodiment according to the present invention.

The underlying insight behind the invention is that individuals and organizations responsible for the design, creation, and maintenance of their home page generally follow some basic unwritten rules. These rules can be exploited to automatically identify the owner of the home page with a high probability of success. Once the owner of the home page is determined, an SIC code is assigned to it by looking up the owner in a Yellow Pages database. If a matching entry exists, then the owner is a business, otherwise the owner is deemed to be an individual with a personal home page.

FIG. 1 shows a preferred architecture for implementing a geographically bound resource discovery system. The main components of interest are MetroBot 126, IPLink 113, and YPLink 112.

The World-Wide Web ("the Web") 124 is based on a client-server architecture. The Web is the graphical, multimedia portion of the Internet 120. The client side program is a Web browser 100 and the server side is a computer running the HTTPD program 102. The Web server is accessed through the Internet by specifying a Uniform Resource Locator (URL). User-entered queries are sent to a back-end processor or search engine 104 which gathers results from various databases 106, 108, 110, and 128, and formats the request and presents them back to the user.

MetroBot 126 is an indexer robot which traverses hyperlinks in HTML documents and indexes the content into a searchable Web index database 128. These hyperlinks or URLs point to other Web pages making it possible to recursively traverse large portions of the Web from a single, well-chosen URL (seed URL). MetroBot begins its traversal from known Root URL 119 such as the home page of a local service provider (SP), such as an internet service provider (ISP). New links that are discovered are stored in New URLs database 118. These links are processed by IPLink 113 and YPLink 112 to extract new Root URLs at which point the whole process repeats itself. Furthermore, YPLink periodically supplements its New URL list by querying global search engines 121 using strategic keywords (e.g., regional city, county, state names, zip codes, and industry specific terms).

The first level of localization is achieved by limiting URLs to registered domain names 106. YPLink extracts domain names from the New URL database and then queries the InterNIC database 122 where records of registered domain names containing company name, contact, street address, and Internet Protocol (IP) addresses are kept. This InterNIC database can be accessed through the Unix whois (1) command. YPLink merges the InterNIC address database 108 with the Yellow Pages data 110. This process is described in detail below.

The next level of localization is more complex since most businesses do not have their own registered domain name. Instead, they have their home page hosted on local SPs (or ISPs) or Online Service Providers (OSPs) Web Servers.

The first step in solving this problem is for IPLink 113 to characterize URLs by their IP addresses. FIGS. 2 and 3A-3C shows the IPLink flow logic. IPLink identifies the following attributes based on the IP addresses of New URLs:

True/Virtual Web Servers vs. Shared Web Servers.
ISP vs. Non-ISP hosts.
Root Domain of URLs.
Root Path of URLs.
Client Directory Paths if host is an ISP.

A new URL is retrieved from the New URL database 200 and is parsed into the domain name and directory path portions. If it is a new domain 205, then its Web IP address (i.e., www.domain.name) is retrieved using the Internet Domain Name Service 122. The Unix nslookup(1) utility 210 returns an IP address given a domain name. The corresponding IP address is stored in the ISP database 114. A reverse lookup 210 of the Web IP address is also performed to determine 215 if the given URL is hosted on a true (or virtual) Web server 220 or a shared Web server 225. A domain name with its own unique Web IP address indicates a true or virtual Web server (non-ISP host). Multiple domain names for a single Web IP address indicates a shared Web server (ISP host).

The official domain name (Root Domain) 220 and 225 for the IP address is the domain name of the ISP (master/slave name server information returned by whois(1) can also be used to accurately identify the ISP if the Root Domain does not correspond to the ISP). Root Domain is only used for displaying URL information on search results not for further processing.

Figure 3A:
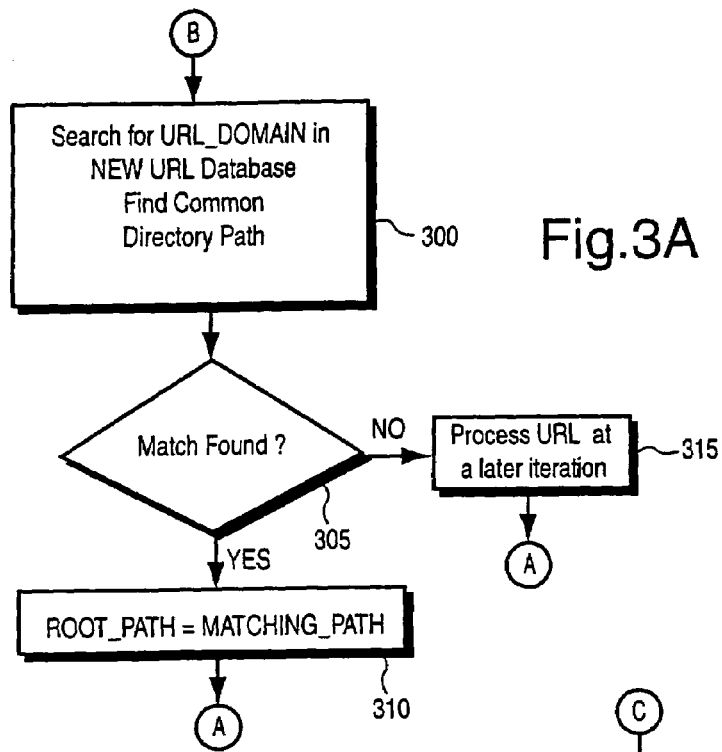
FIGS. 3A-3C are sub-processes of the IPLink flow chart shown in FIG. 2.

Turning to FIG. 3A, for shared servers 225, the Root Path is determined by searching 300 for the given domain name in the New URL database 118 and finding common directory paths 305. If no match is found 315, the URL will automatically be processed at a later iteration 230, otherwise the Root Path is set to the matching path 310.

Figure 3B:
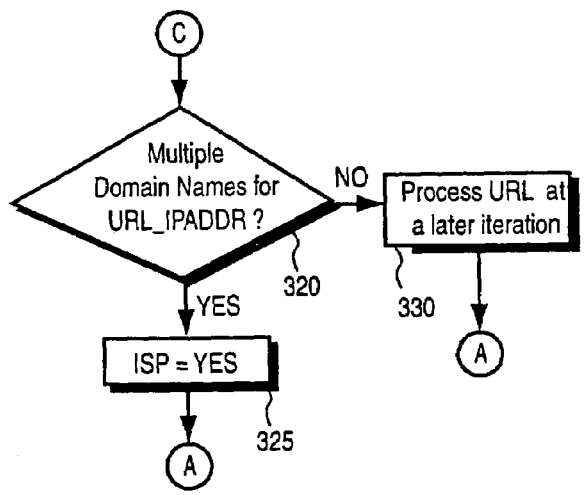

Turning to FIG. 3B, for virtual servers 220, the Root Path is simply the root directory ('/'). These servers may or may not be ISPs. If multiple domain names exist for the given IP address 320, then it is classified as an ISP 325, otherwise it is processed at a later iteration 330, 235 and 240. It is possible for organizations to become ISPs in the future by simply adding/hosting new domain names on their existing Web servers.

Figure 3C:
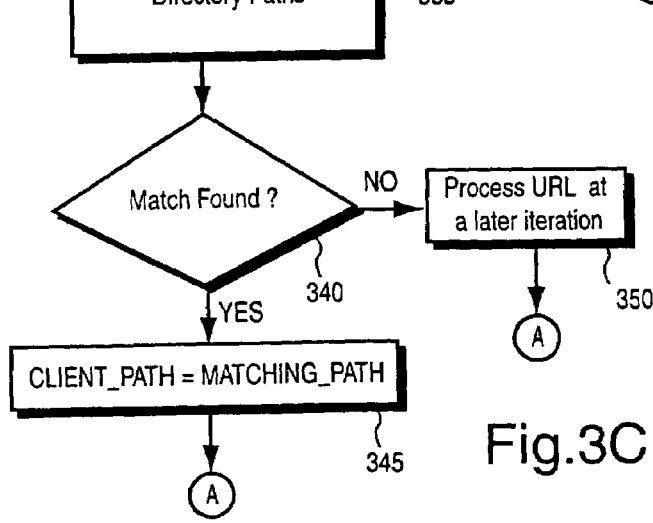

The directory path where the ISP stores its customers Web pages is called the ISP Client Directory Path 116. This data is initially created manually for a few local ISPs (seed ISPs). This path is identified automatically 335 by searching for the given domain name in the Root URL database 119 and finding common directory paths 340, as shown in FIG. 3C. If no match is found 350, then it is processed at a later iteration 245. Matching paths 345 point to the ISPs Client Directory Path. This process improves over subsequent iterations when enough data is gathered and patterns can be recognized from a large set of ISP Web Servers.

YPLink encompasses the first phase of identifying and characterizing IP addresses. The next phase is to automatically identify businesses hosted on ISP Web servers.

Figure 4:
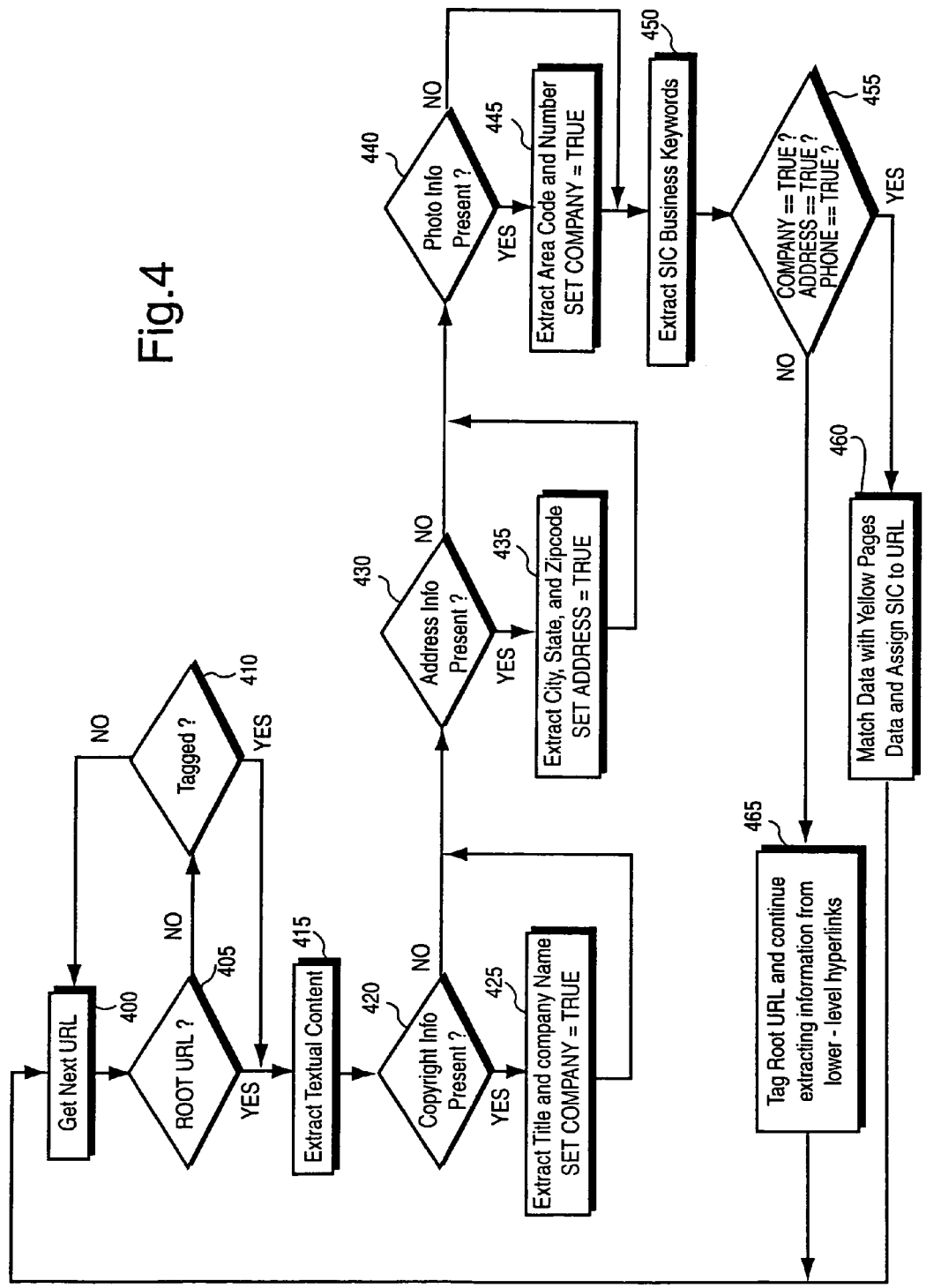
FIG. 4 depicts the flow chart of YPLink for identifying business pages.

FIG. 4 shows the YPLink flow chart. YPLink determines if a Web page belongs to a business or an individual. YPLink takes its input, a URL, from IPLink. FIG. 4 shows the flow diagram for the YPLink process. The first step after retrieving a URL 400 is determining if it is a "Root URL" or a "Leaf URL" 405.

A Root URL is the entry point for an organization's or individual's home page on the World-Wide Web. A Root URL may or may not be the same as the Home page. Leaf URLs, on the other hand, are links below an organization's Root URL. Four factors are considered in determining a Root URL:
1. Is the URL hosted on a Service Provider's Web Server?
2. Is the URL on a virtual Web Server?
3. Does the URL contain a directory path?
4. Is the directory path a known Service Provider's Client Directory?

IPLink determines the SP Client Directory Path as described above. The ISP database 114 contains information about Client Directories for various ISPs.

Figure 5:
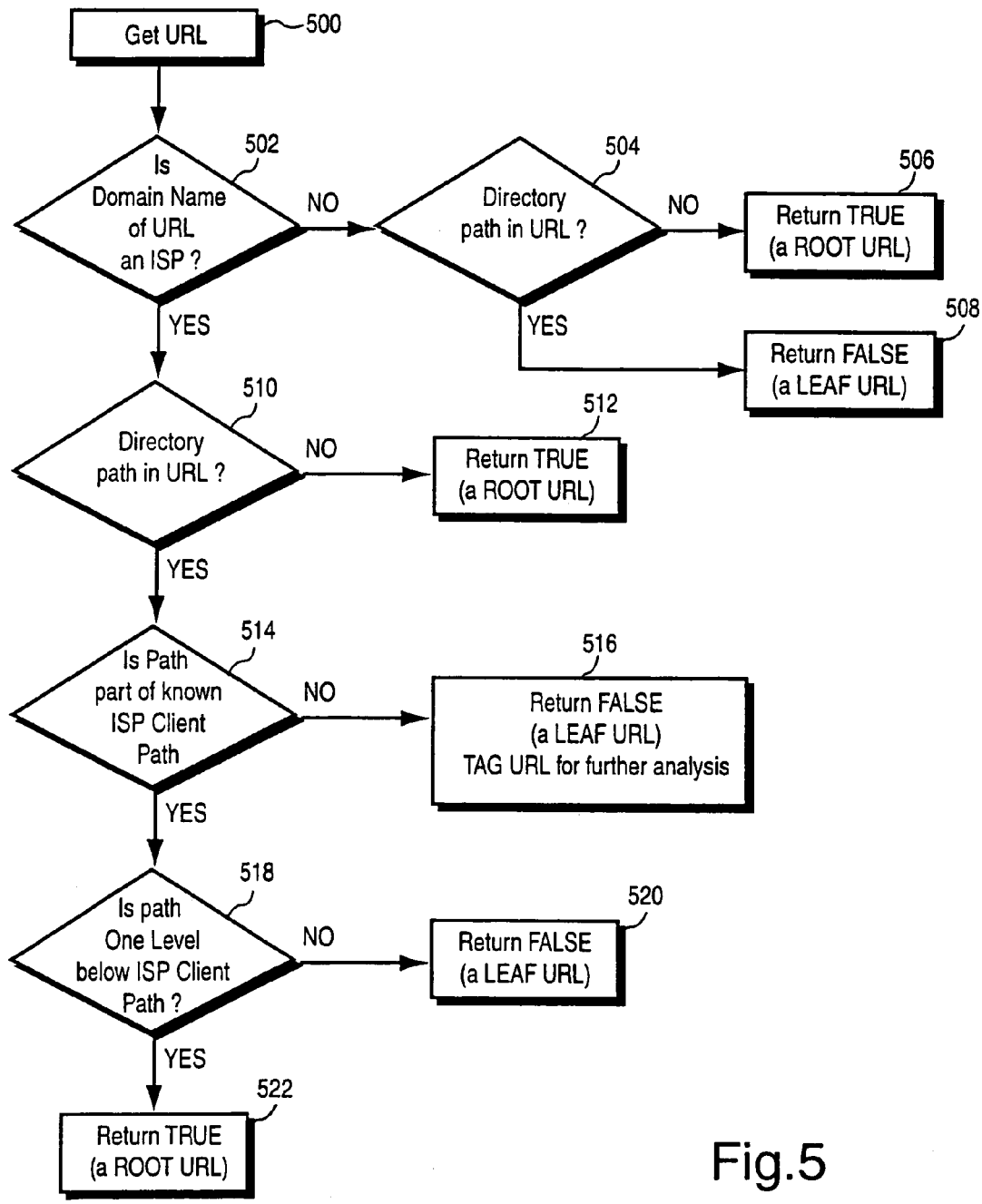
FIG. 5 is a flow diagram for determining if a given uniform resources locator (URL) is a Root URL or a Leaf URL.

FIG. 5 shows the Root URL flow logic. A given URL is retrieved 500 and parsed into two components: domain name and directory path. The domain name is analyzed to see if it is an ISP 502. If multiple IP addresses are associated with the domain name, then the domain name is an ISP. If the domain name is not an ISP, then the directory path component is checked 504. A missing directory path signifies a Root URL 506, otherwise it is a Leaf URL 508.

If the domain name is an ISP 510, then it is also a Root URL if no directory path exists 512. If a directory path exists 514, then the path is compared to a list of known ISP Client Directory paths. No match 516 indicates a Leaf URL, otherwise the directory path level is analyzed 518 for final Root URL determination. If the path is one directory level below the Client Directory path then it is a Root URL 522, otherwise it is a Leaf URL 520.

Figure 6:
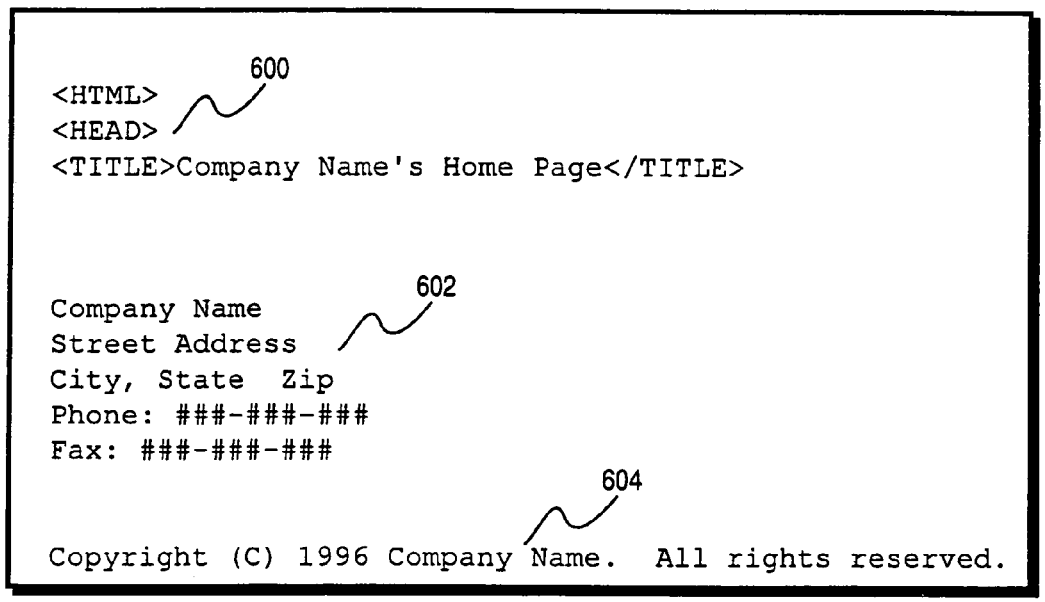
FIG. 6 is a template of a typical business home page.

After a URL is determined to be Root URL, then the home page it points to is analyzed 415 to see if it follows some basic guidelines. A typical home page layout is illustrated in FIG. 6. Other than following HTML requirements, there is no rule or standards for the layout of textual content. The key pieces of information required to ascertain the owner of a Web page are 1) company name, 2) zip code, and 3) telephone number. These three pieces of information do not have to exist in the Root URL. They can reside anywhere among various Leaf URLs beneath a Root URL. In many cases, this information is stored in a file called about.html. However, the same information could be stored in other, similarly named files, as would be known to those skilled in the art taking the present specification as a whole. The process described below extracts this information automatically and assigns it to the Root URL being analyzed.

The company's name is usually included in the HTML TITLE tag 600. However, the company's name could be included in other locations, as would be known to those ordinarily skilled in the art within the purview of the present specification. The layout of the address, if present, usually is in a standard recognizable format 602. Most businesses also tend to include copyright notices near the bottom of their documents. A string search for "copyright", "©", and "©" is performed near the bottom 604 of the home page. The company name usually appears near the copyright notice. A match of the organization or individual's name in the copyright field 420 and the TITLE field 425 provides the first indication of the owner of the home page. If no match is found, then the URL is tagged for further analysis during the next iteration.

The next step is to analyze the URL for address 430 information. Addresses have an easily identifiable format. In the U.S., the format is the city name followed by a comma and then followed by the full state name or abbreviation and finally a five or nine digit zip code. However, other common formats/methods also are possible and would be known to those ordinarily skilled in this art field to locate the zip code. This string is parsed in the HTML file after stripping all tags 435. The only information required is the 5-digit zip code since the city and state can be determined by this field alone. YPLink stores addresses associated with Root URLs and domain names in an address database 106.

If a phone format field is present then it is also extracted and stored 440. U.S. phone field is a 10-digit field where the first three digits representing the area code are optionally enclosed in parentheses or separated by a dash, space, or a period, and then followed by a 7-digit number which is separated by a dash, space, or a period after the third digit 445. Other similar methods of identifying a phone number are known to those ordinarily skilled in the art.

The pair consisting of the company name and zip code are usually enough to identify a business 455. A query is constructed using this pair and sent to a Yellow Pages database server. This database is indexed by business names and zip codes. If a single match is found, then the resulting SIC code is assigned to the corresponding Root URL 460. If multiple entries are matched, then the phone field is also included in the query to assure that only a single entry is retrieved. If no match is found, then the URL is tagged 465 for further analysis of lower-level hyperlinks during the next iteration. The matching data is stored in an enhanced Yellow Pages database 108.

If no match is found at any level, then the page is tagged 450 as a personal page with an SIC code assigned according to the closest match based on the Business Semantic Terminology database 110. This database is a proprietary thesauri of keywords relating business categories in the Yellow Pages and other emerging industries such as Internet technology to extended SIC codes.

While the invention has been described in terms of a single preferred embodiment, those skilled in the art will recognize that the invention can be practiced with modification within the spirit and scope of the appended claims.

For example, while the invention above has been described primarily in terms of (e.g., implemented in) a software process and a system employing software and hardware, the invention could also be implemented with hardware as would be known by one of ordinary skill in the art taking the present specification as a whole.

Having thus described my invention, what I claim as new and desire to secure by Letters Patent is as follows:

1. A method for performing a search of network accessible content, the method comprising:
traversing a network of web documents to identify business names and geographic data associated with the web documents;
identifying a business name and geographic data associated with a particular web page;
determining web page identifying data for the particular web page;
extracting the identified business name and geographic data associated with the particular web page;
based on the extracted business name and geographic data, accessing a business directory to determine a business category code that is associated with the extracted business name and geographic data;
storing the web page identifying data and the business category code in association with one another and within an entry in an electronic data store, thereby enabling identification of the web page identifying data when performing subsequent searches based on user queries associated with the business category code;
receiving a query from a user, the query being related to a business category and associated with at least one business category code;

searching the stored business category codes based on the received query;

identifying, within the electronic data store, one or more entries that include a business category code that is associated with the business category of the query; and returning a result to the user, the result including web page identifying data included in the identified one or more entries.

2. The method as in claim 1 wherein the geographic data includes a zip code.

3. The method as in claim 1 wherein the geographic data includes local area exchange information.

4. The method as in claim 3 wherein the local area exchange information includes an area code.

5. The method as in claim 1 wherein the geographic data includes a city and a state.

6. The method as in claim 1 wherein the web page identifying data includes a uniform resource locator for the particular web page.

7. The method as in claim 1 further comprising:
storing the geographic data in the entry within the electronic data store in which the business category code and the web page identifying data are stored.

8. The method as in claim 1 wherein the business category code is configured to support a search.

9. The method of claim 1 further comprising:
analyzing the received user query to determine a business category code associated with the received user query, wherein identifying, within the electronic data store, one or more entries that include a business category code that is associated with the business category of the query includes identifying, within the electronic data store, one or more entries that include the determined business category code associated with the received user query.

10. The method of claim 9 wherein:
analyzing the received user query to determine the business category code associated with the received user query includes analyzing the received user query to determine that the received user query is associated with the stored business category code that is associated with the extracted business name and geographic data;

identifying, within the electronic data store, one or more entries that include a business category code that is associated with the business category of the query includes identifying the entry in the electronic data store storing the web page identifying data and the business category code that is associated with the extracted business name and geographic data in association with one another; and returning a result to the user includes returning a result that includes the web page identifying data stored in the entry in the electronic data store in association with the business category code that is associated with the extracted business name and geographic data.

11. The method of claim 1 wherein extracting the identified business name and geographic data associated with the particular web page includes programmatically extracting the identified business name and geographic data from data stored by an electronic device used in serving the web page over the network.

12. A computer program stored on a computer readable medium for performing a search of network accessible content, the computer program comprising instructions that, when executed by a computer, cause the computer to:

traverse a network of web documents to identify business names and geographic data associated with the web documents;

identify a business name and geographic data associated with a particular web page;

determine web page identifying data for the particular web page;

extract the identified business name and geographic data associated with the particular web page;

based on the extracted business name and geographic data, access a business directory to determine a business category code that is associated with the extracted business name and geographic data;

store the web page identifying data and business category code in association with one another and within an entry in an electronic data store, thereby enabling identification of the web page identifying data when performing subsequent searches based on user queries associated with the business category code;

receive a query from a user, the query being related to a business category and associated with at least one business category code;

search the stored business category codes based on the received query;

identify, within the electronic data store, one or more entries that include a business category code that is associated with the business category of the query; and return a result to the user, the result including web page identifying data included in the identified one or more entries.

13. The computer program of claim 12 wherein the geographic data includes a zip code.

14. The computer program of claim 12 wherein the geographic data includes local area exchange information.

15. The computer program of claim 14 wherein the local area exchange information includes an area code.

16. The computer program of claim 12 wherein the geographic data includes a city and a state.

17. The computer program of claim 12 wherein the web page identifying data includes a uniform resource locator for the particular web page.

18. The computer program of claim 12 further comprising instructions that cause the computer to:
store the geographic data in the entry within the electronic data store in which the business category code and the web page identifying data are stored.

19. The computer program of claim 12 wherein the business category code is configured to support a search.

20. A computer system for performing a search of network accessible content, the system comprising:
means for traversing a network of web documents to identify business names and geographic data associated with the web documents;

means for identifying a business name and geographic data associated with a particular web page;

means for determining web page identifying data for the particular web page;

means for extracting the identified business name and geographic data associated with the particular web page;

means for based on the extracted business name and geographic data, accessing a business directory to determine a business category code that is associated with the extracted business name and geographic data;

means for storing the web page identifying data and the business category code in association with one another and within an entry in an electronic data store, thereby enabling identification of the web page identifying data when performing subsequent searches based on user queries associated with the business category code;

means for receiving a query from a user, the query being related to a business category and associated with at least one business category code;

means for searching the stored business category codes based on the received query;

means for identifying, within the electronic data store, one or more entries that include a business category code that is associated with the business category of the query; and means for returning a result to the user, the result including web page identifying data included in the identified one or more entries.

21. The computer system of claim 20 wherein the system is a computer system.

22. The computer system of claim 20 wherein the system is a resource discovery system.

23. The computer system of claim 20 further comprising a processor.

* * * * *